Aug. 15, 1972     J. R. SMITH ET AL     3,684,679
APPARATUS FOR TESTING THE CORROSION RESISTANCE OF TINPLATE
Original Filed Sept. 8, 1965     4 Sheets-Sheet 1

INVENTORS
JOHN R. SMITH
JAMES A. BRAY

*Shanley & O'Neil*

ATTORNEYS

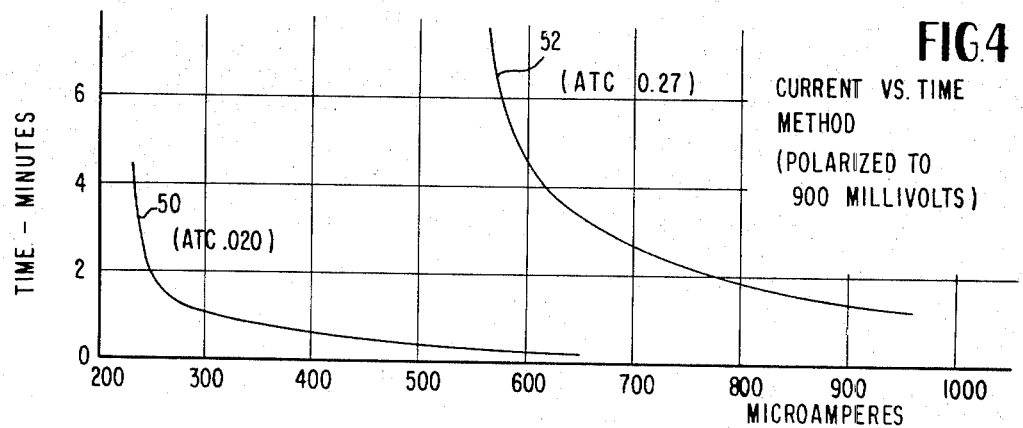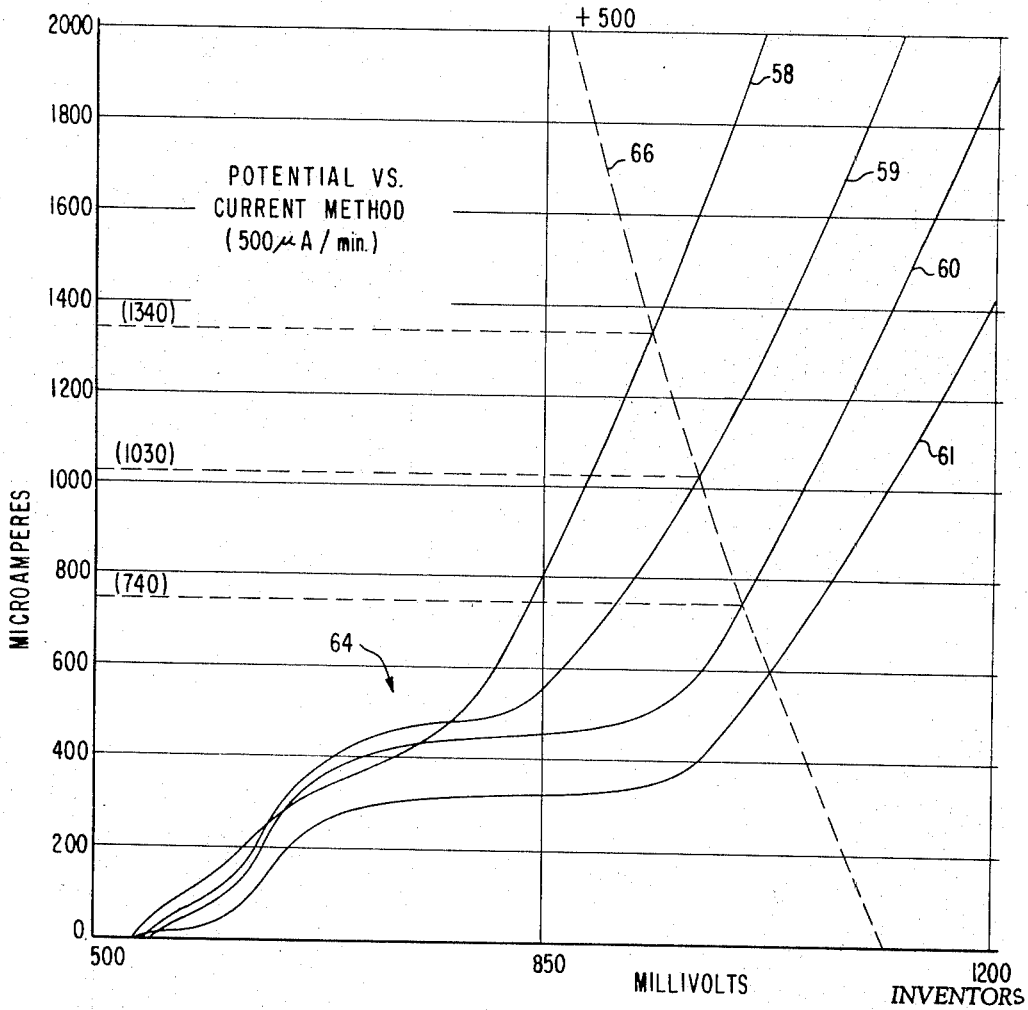

Aug. 15, 1972   J. R. SMITH ET AL   3,684,679
APPARATUS FOR TESTING THE CORROSION RESISTANCE OF TINPLATE
Original Filed Sept. 8, 1965   4 Sheets-Sheet 4

INVENTORS
JOHN R. SMITH
JAMES A. BRAY

ATTORNEYS

United States Patent Office

3,684,679
Patented Aug. 15, 1972

---

3,684,679
APPARATUS FOR TESTING THE CORROSION RESISTANCE OF TINPLATE
John R. Smith, 151 Keagle Drive, Steubenville, Ohio 43952, and James A. Bray, Box 225, Bergholz, Ohio 43908
Original application Sept. 8, 1965, Ser. No. 485,790, now Patent No. 3,479,256, Nov. 18, 1969. Divided and this application June 5, 1969, Ser. No. 841,179
Int. Cl. G01n 27/00, 27/28
U.S. Cl. 204—195 C
1 Claim

ABSTRACT OF THE DISCLOSURE

An electrolytic test cell for determining the corrosion rate of a metal. The cell comprises anode and reference electrode means and has sidewall means defining a predetermined area for exposing a test sample to the cell. Means are provided for yieldably holding said test sample in position and the cell has drain means.

---

Figure 1:
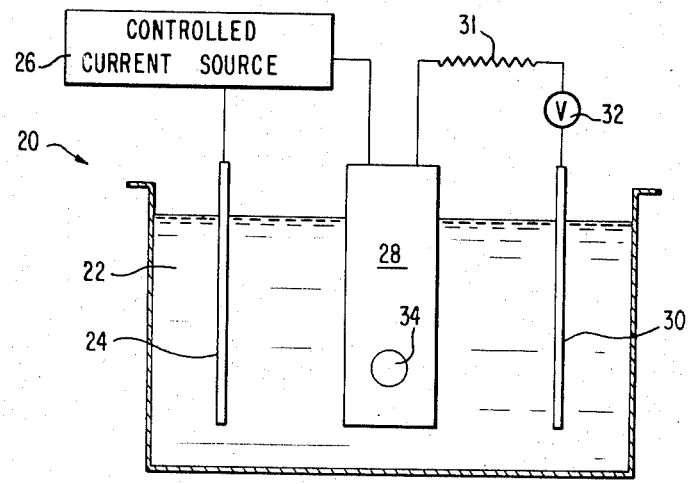

This application is a division of copending application Ser. No. 485,790, filed Sept. 8, 1965 and now Pat. No. 3,479,256, issued Nov. 18, 1969.

This invention is concerned with methods and apparatus for determining electrochemical behavior, for example corrosion rate, of metallic surfaces and, more specifically, determining the shelf life of tinplate containers to be used for packing citrus products, tomatoes, and the like.

Corrosion performance of tinplate containers packed with an acid-food can be accurately determined by pack performance tests. This involves using tinplate of known production history to make containers and packing such containers with selected food products under commercial conditions. The containers are then stored under controlled conditions and tested at regular intervals until the pack fails. This is a time consuming test involving from 14 to 30 months, and longer, depending on the grade of tinplate. However, for a number of years it was the only method available and presently remains the basis for comparison of other tests.

Can manufacturers and tinplate producers have, for some time, been seeking an accelerated test which correlates well with pack performance data. A number of tests for identification of individual manufacturing variables have been developed such as the hydrogen evolution, the pickle lag, and the iron solution tests. However, each of these tests is concerned with a relatively isolated property necessary for acceptable shelf life but none produces a result which can be correlated satisfactorily with expected shelf life.

In recent years a decided advance toward an ideal test was made with the alloy-tin-couple test, see "The Alloy-Tin-Couple Test—A New Research Tool" by G. G. Kamm et al., in "Corrosion," vol. 17, February 1961, pages 84t–92t, for details of this test. The alloy-tin-couple test, known as the ATC test, has been accepted by can manufacturers and tinplate producers alike as a satisfactory test of shelf life.

Briefly, the ATC test was designed to simulate closely conditions existing within a tinplate container, filled with grapefruit juice, in which the steel base metal is protected from corrosion by coupling with tin. The test is essentially a measurement of the continuity of tin-iron alloy-layer based on the accepted theory that the more continuous the alloy-layer the longer the shelf life of acid food containers. The test consists of coupling a tinplate sample which has been detinned to the alloy surface and a pure tin electrode in deaerated grapefruit juice containing 100 p.p.m. of soluble stannous tin. After 20 hours, couple current between the sample and the tin electrode is measured and expressed as current density in microamps per square centimeter. This current density is referred to as the ATC number or value and has been directly correlated with shelf life based on pack performance data.

The ATC test involves delicate procedures requiring at least 20 hours plus specimen preparation time. A number of factors which are important to success of the ATC test are oxygen free conditions, controlled stannous tin concentration, a prescribed method of detinning and masking a specimen, and precise temperature control of a grapefruit juice electrolyte.

Notwithstanding the time saving advantages of the ATC test over the performance pack test, it does not meet the requirements of high speed production of large tonnages of electrolytic tinplate. When using the ATC test, slitting or bundling of coils and packaging of the tinplate product must be delayed, usually at least forty-eight hours, and extra handling is required, while awaiting test results. This deficiency is corrected by the present invention by making desired quality control tests practicable during production.

The present invention provides a rapid test in which electrochemical corrosion rate results are obtained in less than five minutes, permitting the results to be put to practical use in production and packaging control. Test results can be produced on a recorder chart making a permanent record. A special electrolytic cell eliminates the necessity for wax masking as in the ATC test and reduces specimen preparation time. An aerated electrolyte can be used eliminating the need for a protective atmosphere and soluble stannous tin need not be added to the electrolyte. Synthetic media of known compositions can be used eliminating the need for natural products which are subject to variation in day to day operations. Less technical skill is required for the tests of the present invention than that required by prior art tests and test results correlate well with either pack performance tests or ATC values providing a rapid and accurate indication of shelf life.

The present invention can be applied to testing electrochemical behavior of a number of metallic surfaces however, it is especially useful in corrosion testing of tinplate. The electrochemical behavior of tin is unique in that iron is sacrificial to tin under aerated conditions yet tin is anodic with respect to iron in the absence of oxygen, a condition which exists within a container. This unusual behavior has apparently helped block development of an easy and rapid test for the interior of a tinplate container and required deaerated conditions as in the ATC test. This problem is circumvented completely by the present invention.

Another unusual feature of the present invention is measurement under dynamic rather than static conditions. Polarization studies of the prior art have been presented as potential versus current relationships at or near steady state conditions (see Corrosion Resistance of Electrolytic Tinplate, by G. G. Kamm et al., Corrosion, vol. 17, February 1961, pages 77t–83t). The present invention departs from the prior teachings by presenting electrochemical corrosion as a three-dimensional concept involving potential, current, and time. With this concept results are obtained quickly without waiting for steady state conditions. Further, the difficulties of working in three dimensions are obviated with a novel two-dimensional indicator system.

Figure 2:
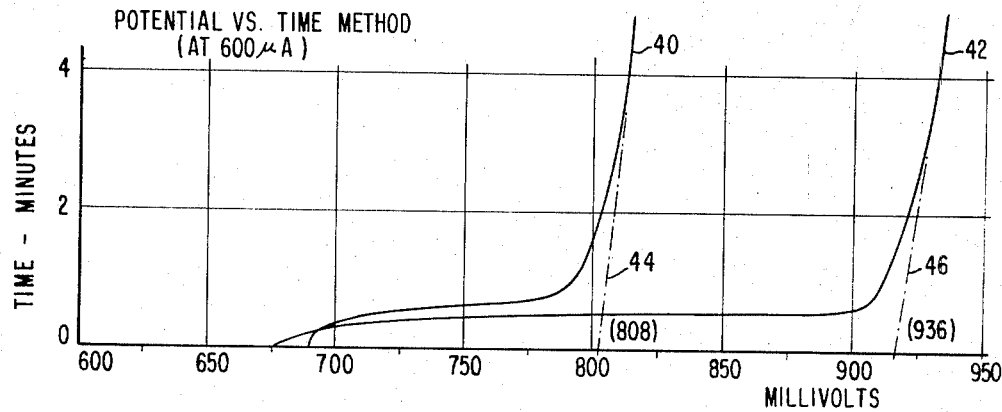
Figure 3:
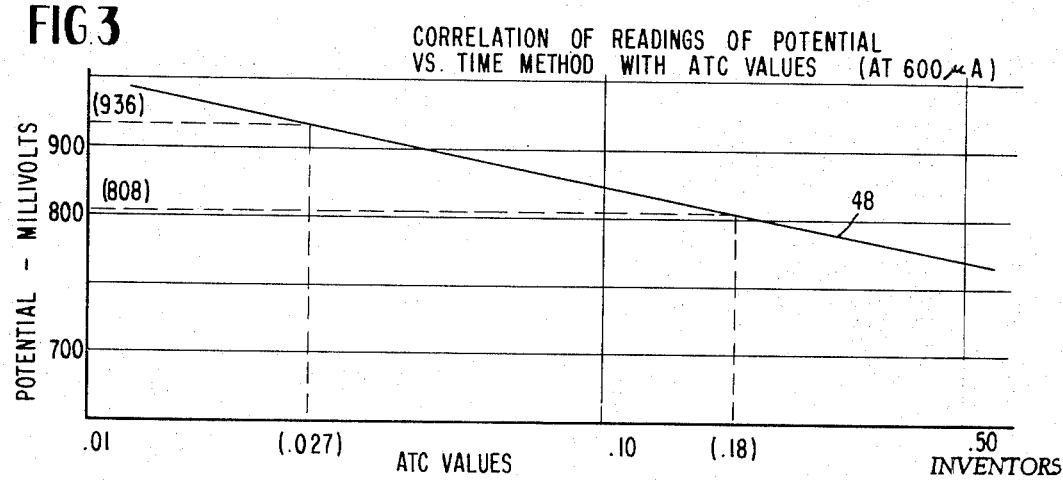
Figure 6:
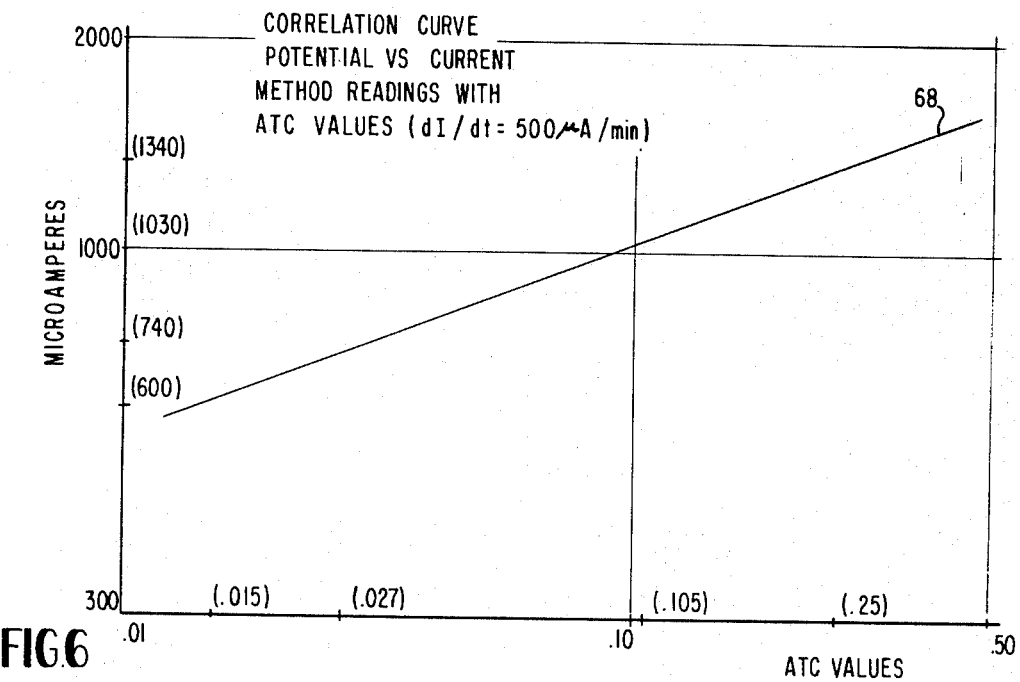
Figure 7:
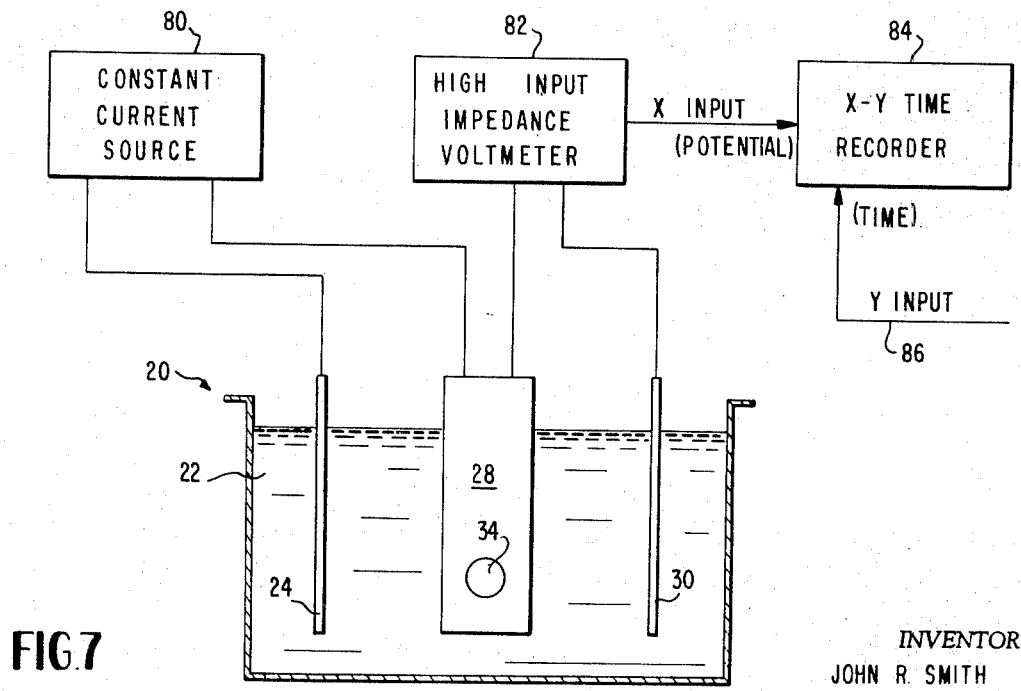
Figure 8:
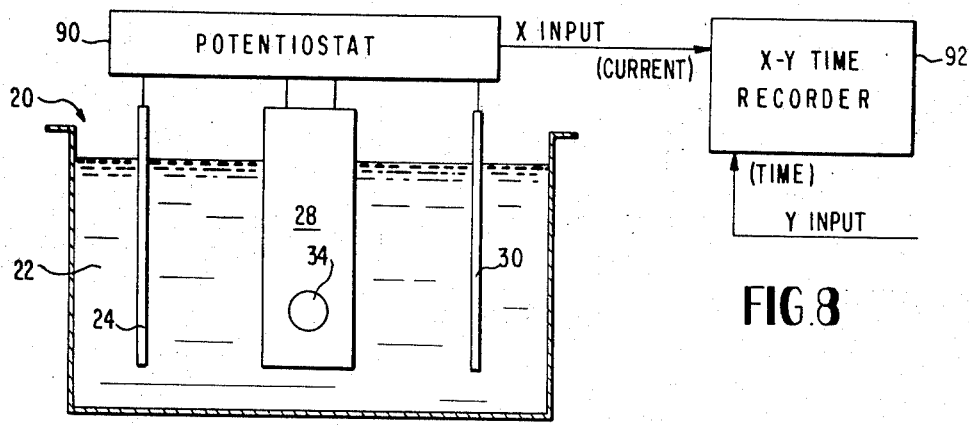
Figure 9:
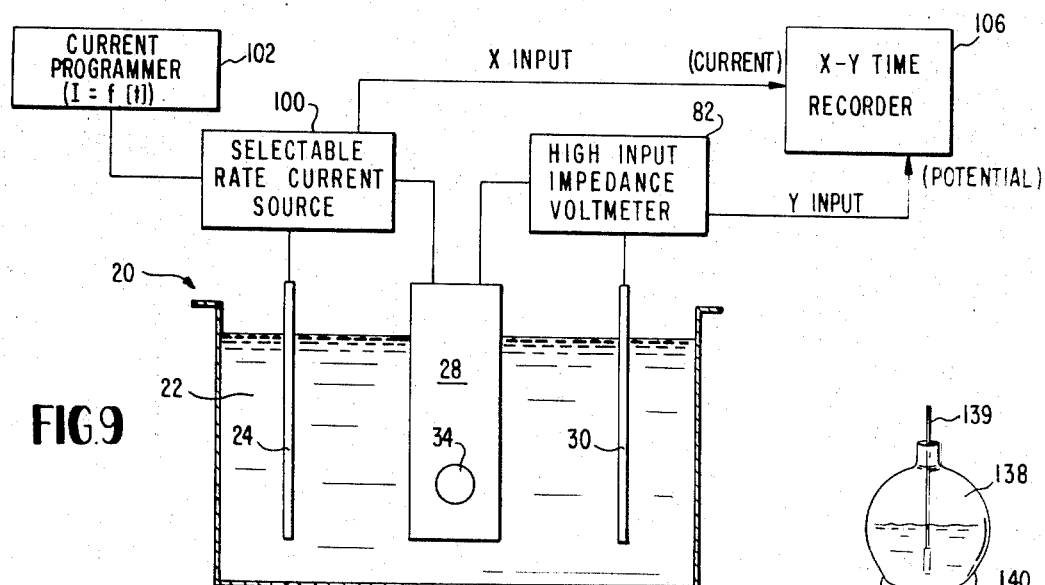
Figure 10:
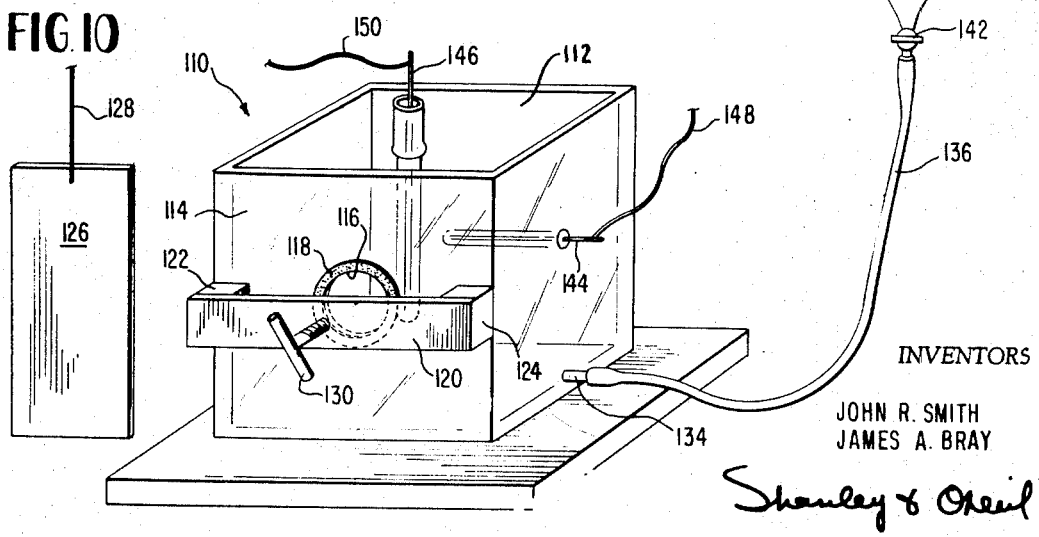

Other advantages will be brought out in describing application of the invention to the testing of tinplate. Drawings to be used in this description include:

FIG. 1 a schematic diagram of test cell apparatus included in the invention,

FIG. 2 a graph of test results obtained by one method taught by the invention,

FIG. 3 a correlation curve for relating the test results of FIG. 2 to ATC values, FIG. 4 a graph of test results obtained by a second method taught by the invention, FIG. 5 a graph of test results obtained by a third method taught by the invention, FIG. 6 is a correlation curve for relating the test results of FIG. 5 to ATC values, FIG. 7 a schematic diagram of novel electronic analyzer apparatus used in obtaining the test results of FIG. 2, FIG. 8 a schematic diagram of novel electronic analyzer apparatus used in obtaining the test results of FIG. 4, FIG. 9 a schematic diagram of novel electronic analyzer apparatus used in obtaining the test results of FIG. 5, and FIG. 10 a perspective view of test cell apparatus included in the invention.

Where possible in these features like reference numerals have been used to designate like parts.

Referring to FIG. 1, test cell 20 includes an electrolyte 22, anode 24 coupled through current source 26 and electrolyte 22 to specimen electrode 28, and reference electrode 30 connected through resistor 31 and potentiometer 32 to specimen electrode 28. In the specific embodiment to be described, specimen electrode 28 is tinplate with a predetermined area 34 of detinned surface exposed to electrolyte 22. Electrolyte 22 can be natural grapefruit juice or a synthetic medium having a pH around 3.3. Anode 24 is inert and insoluble and is made from platinum; however carbon, palladium, gold, tantalum or the like can be used. Reference electrode 30 can be a standard saturated calomel pH electrode. A typical value for resistor 31 is $10^9$ ohms.

In testing tinplate, a specimen is electrolytically cleaned and a portion of the specimen is stripped of tinplate down to the alloy-layer, rinsed, and dried before insertion in a test cell. A predetermined area of the detinned surface is exposed to the electrolyte. The electrolyte temperature is controlled, for example when testing tinplate in natural or synthetic grapefruit juice, at 72° F. plus or minus 1° F.

In accordance with the invention, the electrolyte can be aerated and it is not necessary to house the cell in a controlled atmosphere since the large polarizing currents in the anode 24 and specimen electrode 28 circuit overcome the effects of oxygen. These currents deplete the oxygen content of the electrolyte in the region of the specimen electrode which then allows the specimen to polarize as it would in an oxygen-free electrolyte.

Within tinplate containers packed with acid-food products, the tinplating is anodic to the steel base metal. This is a result of the deaerated environment and the presence of organic substances capable of sequestering stannous ions. Other organic substances may be present which act as corrosion inhibitors or cathodic depolarizers and it is believed that the amount and balance between the inhibitors and the depolarizers determines the corrosivity of an acid product. Corrosion occurs mainly at areas of exposed steel and therefore determination of the extent of alloy-layer coverage is of paramount importance in determining shelf life. In making determinations based on polarization, the present invention measures potential, current and time relationships under dynamic conditions. Graphically these establish a three-dimensional relationship however, accurate two-dimensional representation is provided by holding one of the variables constant, or in effect constant, by one of the following test methods:

Voltage vs. Time—the potential between the specimen electrode and reference electrode is recorded vs. time, while the current in the anode-specimen electrode circuit is maintained constant. This is referred to as the galvanostatic method.

Current vs. Time—the current in the anode-specimen electrode circuit required to maintain a constant potential between the specimen electrode and the reference electrode is recorded vs. time. This is referred to as the potentiostatic method.

Voltage vs. Current—the potential between the specimen electrode and the reference electrode is recorded versus the current in the anode-specimen electrode circuit, with the current being varied as a known function of time.

Potential vs. Time curves 40, 42 shown in FIG. 2 were obtained using a grapefruit juice medium with current level in the anode-specimen electrode circuit at 600 microamps. The potential between the specimen electrode and the reference electrode is measured as indicative of the extent of alloy coverage and therefore the quality of the sample. In essence, the potential reading is a measure of the ease of polarization of the specimen. A poor sample, having a high amount of exposed steel, is more difficult to polarize at the selected constant current in the anode-specimen electrode circuit and a lower potential exists between the specimen electrode and reference electrode. A higher quality (longer shelf life) sample has less exposed steel and is less difficult to polarize; therefore a higher potential would be read at the selected current. A potential reading is made at the end of the break in the potential curve (see FIG. 2) by "boxing" the curve as shown in dotted lines 44, 46 or a reading is made at the end of a fixed period of time, such as a minute and a half.

Potential readings from this galvanostatic method correlate well with ATC values or with values from shelf life pack performance tests. FIG. 3 shows a correlation curve 48 for potential readings obtained with samples tested at a constant current of 600 microamps in the anode-specimen electrode circuit using a grapefruit juice electrolyte. Data for correlation curve 48 is derived by testing a series of specimens of known ATC value and plotting potential readings versus ATC values. A similar curve could be derived using specimens of known shelf life from pack performance tests.

It will be seen from curve 40 of FIG. 2 that a potential reading of 808 millivolts is obtained. Entering the graph of FIG. 3 with 808 millivolts it will be seen that the ATC value for this specimen is 0.18. The potential reading for curve 42 is 936 millivolts; by entering the graph of FIG. 3 as above, an ATC value of .027 is obtained.

Constant current values for the Potential vs. Time test method can be varied widely and still produce valid results. Current levels in the range of 100 to 1200 microamperes have been used satisfactorily; a current level in the range of 500 to 1000 is preferred. The higher the selected current level the more rapidly oxygen depolarization takes place resulting in an earlier reading.

A decided advantage of the Voltage vs. Time method is the simplicity of instrumentation since instrumentation can be labeled directly in ATC values or shelf life once correlation has been established. This mode provides rapid, accurate results and is especially suitable for the production control work. Because of the simplicity of the test method and instrumentation it can be used by production personnel without extensive preliminary training.

In the potentiostatic method, the current in the anode-specimen electrode circuit required to maintain a constant potential between the specimen electrode and the reference electrode is plotted versus time. Current vs. Time curves 50, 52 of FIG. 4 were obtained using a grapefruit juice electrolyte at a potential of +900 millivolts. The current required to polarize a sample to the selected voltage is indicative of the extent of alloy-layer coverage. Less current is required to maintain a selected voltage with a specimen having good alloy-layer coverage. Current readings can be obtained by boxing the current curve or based on fixed values of current or time. A correlation curve based on tests of known ATC value at the preselected potential is entered with the current reading to obtain an ATC value for the specimen. Polarization voltages selected can fall in the range of −2000 to +2000 m.v. since a specimen can be polarized anodically or cathodically in this test method.

Basis for the Potential vs. Current test method is a determination of the couple current within a container. This current is ordinarily provided by the tin coupled to the steel within a container and causes polarization. A measurement of the current provides an indication of the extent of alloy coverage and therefore an indication of shelf life.

The Potential vs. Current curves 58 through 61 of FIG. 5 were obtained in the test cell of FIG. 1 using grapefruit juice as the electrolyte. Time is introduced as a factor by increasing current in the anode-specimen electrode circuit at a linear rate of 500 microamps per minute. Oxygen depolarization takes place at flattened portion 64 in the curves where potential changes rapidly with small changes in current. In order to obtain a couple current reading from these curves an anodic polarization curve for tin is obtained in the same environment. The tin curve 66 is obtained by connecting a pure tin electrode in place of the specimen, reversing the polarity of the current in the anode-specimen electrode circuit, increasing current at a linear rate of 500 microamps per minute, and recording Potential vs. Current. The resulting tin curve 66 is shifted in potential (to the right in FIG. 5) past the oxygen depolarization portion 64 of the specimen curves in order to eliminate the effect of testing under aerated conditions and thereby simulate the conditions within a sealed container. Intersection of the anodic tin curve with a specimen curve provides a current reading which correlates well with ATC values or shelf life data from test performance packs. The current reading is used to enter a correlation curve 68 as shown in FIG. 6 to obtain an ATC value for the specimen.

Experiments with this test method have shown that good correlation exists no matter how much the anodic tin curve is shifted provided the shift is sufficient to eliminate the oxygen depolarization effect. Further, the test is relatively independent of polarization rate as current rates from 100 to 500 microamperes per minute have been used successfully.

Specimens of known ATC value and known shelf life have been tested with each of the three methods described using synthetic electrolytes and the readings obtained correlate well and consistently with ATC values and shelf life respectively. While the Potential vs. Current method is considered most sensitive the Potential vs. Time method is preferred in production because of simplicity of instrumentation and ease in reading results. No previous test provided such an accurate indication of shelf life as rapidly as the tests of the present invention. The rapid results available open new fields for study in the container market which were not practicable previously such as shelf life tests on acid foods as they vary from region to region. Tinplate best suited for a particular product from a particular region can be determined rapidly using samples of the product as the electrolyte or synthetics based on analysis of that product.

To measure the potential-current-time relationship taught, the invention includes novel electronic analyzer apparatus which will:

Measure and record potential as a function of time at a constant applied current, Measure and record the applied current required to maintain a constant potential as a function of time, and Measure and record potential as a function of applied current with current varying as a function of time.

FIG. 7 shows schematically apparatus for measuring and recording potential as a function of time at a constant applied current. Electrolytic cell 20, as described earlier, includes electrolyte 22, anode 24, reference electrode 30, and specimen electrode 28 with a preselected area 34 exposed to the electrolyte. Constant current source 80 provides constant current in the anode-specimen circuit. High-input impedance voltmeter 82 measures the potential between reference electrode 30 and specimen electrode 28 without drawing significant current. The measured potential is introduced into X-Y time recorder 84 as the X input. Time recorder 84 by means of a synchronous motor drive, provides Y input 86 so that measured potential is Recorded vs. Time.

In the specific embodiment of the apparatus of FIG. 7, current source 80 can take the form of a voltage/current reefrence source available commercially from Princeton Applied Research, Princeton, N.J., Model TC100-2AR; a suitable high-impedance voltmeter available commercially is the Leeds and Northrup, of Philadelphia, Pa., pH meter Model 741; a suitable indicator is a standard X-Y time recorder available from Leeds and Northrup, Philadelphia, Pa., Speedomax G-models, Cat. #69950.

The apparatus of FIG. 8 measures and records current in the anode-specimen circuit required to maintain potential between specimen electrode 28 and reference electrode 30 at a preselected level. Potentiostat 90 measures the potential between reference electrode 28 and standard reference electrode 30 and provides current in the anode-specimen electrode circuit to maintain the potential between the specimen electrode 28 and reference electrode 30 at the selected level. This current is indicated and recorded by X-Y time recorder 92 as the X coordinate and time is introduced by a synchronous motor as the Y coordinate. If time recorder 92 is voltage actuated, as in the Leeds and Northrup model disclosed above, a voltage input proportional to current in the anode-specimen electrode circuit can be obtained across a standard resistor inserted in series between these two electrodes. A suitable potentiostat for the specific embodiment of this apparatus would be the Wenking Model 61TR available commercially from the Brinkman Instrument Company, Cleveland, Ohio X-Y time recorder 92 can be identical to the time recorder of FIG. 7 with current being Plotted vs. Time.

FIG. 9 shows schematically apparatus for measuring the potential between specimen electrode 28 and reference electrode 30 while the current in the anode-specimen circuit is varied at a selected rate. The high-input impedance voltmeter 82 measures the potential between the specimen electrode 28 and the reference electrode 30. Selectable rate current source 100 supplies curent in the anode-specimen circuit. Current source 100 is controlled by current programmer 102 which changes the current at a selected rate. In the specific embodiment described, current is increased as a linear function of time by a rheostat driven at a linear rate. However a logarithmic function or other desirable raee can be provided where suitable. The current in the anode-specimen electrode circuit is indicated and delivered as the X input to recorder 106. In instances where the time recorder is voltage actuated a voltage signal can be obtained by including a known resistance in series with anode 24 and specimen electrode 28 and taking a voltage signal from across the known resistance. The voltage between specimen electrode 28 and reefrence electrode 30 is indicated and delivered as the Y input to the recorder 106. Measured potential is plotted versus current with the current being varied at a selected rate to introduce the time function.

In a specific embodiment of the apparatus of FIG. 9 the selectable rate current source 100 can be a voltage/current reference source as disclosed in relation to FIG. 7. Current programmer 102 which controls current source 100 can be a driven DC rheostat. X-Y time recorder 106 can be the recorder similar to that disclosed in relation to FIG. 8 with potential being Plotted vs. Time.

The invention also provides novel electrolytic cell structure. In the prior art, exposing a predetermined area of a specimen to an electrolyte required masking of surrounding areas and edges of a specimen with an inert material. This procedure is time consuming and increases the possibility of error in testing specimens. In accordance with the present invention a predetermined area of a specimen is exposed to an electrolyte without the necessity of masking or similar steps by a method which is rapid and consistently accurate. With the test cell of the present invention, the specimen is exposed to electrolyte through a flanged area in a cell wall and electrolyte is drained when specimens are being changed.

Test cell 110 of FIG. 10 includes a solution chamber 112 made of an electrolytically inert material such as clear Lucite. Wall 114 of chamber 112 includes aperture 116 outlined by a gasket material 118 made of electrochemically inert material. The gasket 118 accurately defines a predetermined area for aperture 116.

In order to hold a specimen tightly against aperture 116, backing arm 120 is mounted on supports 122 and 124. A backing plate 126 which includes electrical connector 128 is inserted between gasket 118 and backing arm 120. A specimen is inserted between backing plate 126 and gasket 118 and threaded follower 130 moves backing plate 126 toward gasket 118 and locks a specimen in fluid tight engagement with gasket 118.

Means are provided for rapidly withdrawing electrolytes from chamber 112 after a specimen has been tested. These include drain plug means 134 connected by flexible tubing 136 to eleveling bulb 138 supported in stand 140. In order to drain solution from chamber 112, the leveling bulb 138 is held below drain 134 until solution in the chamber 112 drains below the level of aperture 116. The solution can be held in leveling bulb 138 by valve 142. After a specimen is changed and locked in position against gasket 118, valve 142 is opened and, with leveler bulb 138 positioned above the level of liquid in the chamber 112, liquid flows from leveling bulb 138 into solution chamber 112.

Thermometer 139 in leveler bulb 138 is provided for checking solution temperature. Other suitable means for measuring solution temperature and/or for maintaining solution temperature automatically within desired limits can be used.

A typical arrangement of anode 144 and reference electrode 146 is shown in FIG. 11. These are connected by leads 148 and 150, respectively, to electronic analyzer apparatus and a specimen is connected through the backing plate 126 and connector 128. Anode 144 can be platinum wire in the form of a one-half inch coil sealed in the end of a one-quarter inch Lucite tube. Reference electrode 146 can be a standard saturated calomel pH electrode such as the commercially available Leeds and Northrup Std. 1199–30.

The solution chamber can be made from ¼" Lucite with an inside dimension of 3" x 3" x 4" with a ⅞" diameter aperture located in the center of one wall. An O ring, of ⅞" diameter and ⅛" thickness is centered on the ⅞" diameter aperture.

While natural acid-food products can be used, the present invention also teaches use of synthetic mediums which have the advantage of standarization. A synthetic grapefruit juice electrolyte taught by the present invention includes the following:

|  | g./liter |
|---|---|
| Citric acid | 10 |
| Sodium nitrate | 5 |
| Fructose | 35 |
| Sucrose | 50 | made to volume totaling 1 liter with deionized water providing an aqueous synthetic medium having a pH around 3.3. Potassium sorbate in the amount of 0.25 g./liter, can be added as a mold growth inhibitor.

The methods and specific embodiments described can be used for studying other electrochemical behavior in addition to corrosion. Also, numerous modifications to the structures or in the materials disclosed can be made without departing from the spirit of the invention. Therefore, it is understood that the scope of the present invention is defined by the appended claim.

What is claimed is:

1. An electrolytic test cell for exposing a predetermined surface area of a test specimen to an electrolyte comprising chamber means for holding an electrolyte,
   anode means and reference electrode means positioned in the chamber means,
   sidewall means forming part of the chamber means and defining an aperture through the sidewall means to permit contact with electrolyte from exterior of the chamber means,
   gasket means fitted to the aperture in the sidewall means defining a predetermined surface area for contact of electrolyte by a test specimen,
   means for yieldably holding a test specimen in fluid tight contact with the gasket means externally of the chamber means, and
   drain means connected to the chamber means for draining electrolyte from the chamber means.

References Cited

UNITED STATES PATENTS

| 2,531,747 | 11/1950 | Stearn | 204—195 |
| 3,208,926 | 9/1965 | Eckfeldt | 204—195 |
| 2,457,234 | 12/1948 | Herbert et al. | 204—195 |
| 3,166,485 | 1/1965 | Lloyd | 204—195 |
| 3,449,232 | 6/1969 | Bailey | 204—195 |

GERALD L. KAPLAN, Primary Examiner